United States Patent

Rosiello

(10) Patent No.: US 6,622,052 B1
(45) Date of Patent: Sep. 16, 2003

(54) FLEXIBLE PROTOCOL GENERATOR

(75) Inventor: Keith Rosiello, Shrewsbury, MA (US)

(73) Assignee: Zymequest, Inc., Beverly, MA (US)

( * ) Notice: Subject to any disclaimer, the term of this patent is extended or adjusted under 35 U.S.C. 154(b) by 0 days.

(21) Appl. No.: 09/971,264

(22) Filed: Oct. 3, 2001

Related U.S. Application Data

(60) Provisional application No. 60/237,515, filed on Oct. 4, 2000.

(51) Int. Cl.[7] .......................... G06F 15/46; B04B 13/00
(52) U.S. Cl. .............................. 700/11; 700/18; 700/83; 700/273; 494/10; 494/11
(58) Field of Search ............................ 700/11, 17, 18, 700/83, 273; 494/10, 11

(56) References Cited

U.S. PATENT DOCUMENTS

| | | | |
|---|---|---|---|
| 4,204,253 A | * 5/1980 | van den Hanenberg et al. | 714/32 |
| 4,379,335 A | * 4/1983 | Kirsch et al. | 700/264 |
| 5,287,265 A | * 2/1994 | Hall et al. | 700/83 |
| 5,721,676 A | 2/1998 | Bolden et al. | 364/132 |
| 5,865,718 A | * 2/1999 | Chan | 494/10 |
| 5,940,294 A | 8/1999 | Dove | 364/188 |
| 6,143,183 A | * 11/2000 | Wardwell et al. | 210/739 |

FOREIGN PATENT DOCUMENTS

| | | |
|---|---|---|
| EP | 0 344 453 A | 12/1989 |
| WO | WO97/02095 | 1/1997 |

OTHER PUBLICATIONS

International Search Report date of mailing Nov. 25, 2002.

\* cited by examiner

*Primary Examiner*—Leo Picard
*Assistant Examiner*—Douglas S. Lee
(74) *Attorney, Agent, or Firm*—Mintz, Levin, Cohn, Ferris, Glovsky and Popeo, P.C.

(57) ABSTRACT

The present invention is directed to a method for generating a protocol for controlling operation of a device including selecting one or more functions in the operation of the device, ordering the sequence of the selected functions, selecting a value for variables of each of the selected functions, and recording the selected ordered functions and the values to generate a protocol definition file readable by an executable software program to control the device to run the selected functions with the selected values for variables of the functions.

27 Claims, 1 Drawing Sheet

FLEXIBLE PROTOCOL GENERATOR

This application claims benefit under 35 U.S.C. §119(e) of U.S. Provisional App. No. 60/237,515, filed Oct. 4, 2000, the entire disclose of which is herein incorporated by reference.

BACKGROUND OF THE INVENTION

1. Field of the Invention

The invention relates to software that permits a user of a device to generate new device operational sequences or alter existing operations without reprogramming the executable software code of the device.

2. Background of the Invention

Devices such as blood component separation devices and cell processing systems have embedded or disk based software that directs the function of the device. Typically the user has a limited number of choices for selecting the operations that the device will run. Such selections can be made by executing the device's software program and changing the execution constraints by means of a keyboard, touchpad, dials, or buttons. However, if new functionality is desired that has not previously been implemented, then the device's software program must be modified to accommodate the desired affect. This may be a difficult or impossible task if the user of the device has no facility with or training in software development.

Accordingly, there are constraints on the number and kind of operations that the device can execute, and a corresponding lack of flexibility in the use of the device. For example, optimization of an existing operation or adoption of a new operations is not possible with such devices. Any changes to the protocol executed by the device requires programming new executable software code, compiling such code, and loading the executable code on the device.

One approach to these problems was described by Chan in U.S. Pat. No. 5,865,718. The Chan patent describes a protocol record database that can be used in conjunction with operating a centrifuge. Each protocol record includes information relevant to the centrifugation of a certain specimen. Thus users of the centrifuge can search the database for a protocol on the basis of the specimen and/or the type of separation desired, thereby avoiding lengthy searches in the scientific literature for centrifugation conditions (time, temperature, speed) appropriate to a particular specimen. The Chan patent also provides for storage of new protocol records, but does not account for any functions other than control of centrifuge operations as a function of the specimen type to be centrifuged. Thus the approach provided by Chan is insufficiently flexible to account for control of more complex devices such as blood component separation devices and cell processing systems that have multiple systems for processing samples (including incubation, agitation, expression and centrifugation), and where fluids other than a sample are added and withdrawn as needed (e.g., buffers, reagents, and enzymes).

Thus there is a need for a means to control a device having multiple functions through executable software code without manually reprogramming the device. There is also a need for a means to generate new and/or altered operational sequences or protocols that can control the functioning of a device having multiple functions without manually reprogramming the device.

SUMMARY OF THE INVENTION

The invention provides a flexible protocol generator that allows a user to direct the software that controls the functioning of a device and all of its components without reprogramming the executable software code of the device. The invention provides methods for a user to interactively create a storable sequence of one or more steps of a protocol that directs the functioning of a device, to transfer the protocol file to the device, and to execute the protocol via the software that is embedded or stored on that device.

According to one aspect of the invention, methods for generating a protocol for controlling operation of a device are provided. The methods include selecting one or more functions in the operation of the device, ordering the sequence of the selected functions, selecting a value for variables of each of the selected functions, and recording the selected ordered functions and the values to generate a protocol definition file readable by an executable software program to control the device to run the selected functions with the selected values for variables of the functions. In certain embodiments, the methods also include recording the protocol definition file on a computer-readable medium. Preferably, the device controlled by the protocol generator in conjunction with the executable software is a cell processing device or blood processing device.

In other embodiments, the functions are selected from a predetermined group of functions and selectable parameters for a defined protocol. Preferably, the group of functions includes one or more functions selected from among centrifugation, expression, incubation, agitation, addition of a sample, processing chemical or fluid, priming of fluid lines, and purging of fluid lines, although other device functions can likewise be controlled. Preferred variables include the time of a function, the temperature of an operating portion of the device, the speed of a function, the volume of addition, and the ratio of mixture of a sample, processing chemical or fluid. Other variables will be known to one of ordinary skill in the art.

In still other embodiments of the methods, the executable software program coordinately controls hardware of the device to control the functions. Preferably the hardware comprises one or more electrical, mechanical or electromechanical devices, particularly motors, pumps, valves, detectors, and solenoids.

According to another aspect of the invention, methods for controlling the operation of a device are provided. The methods include selecting one or more functions in the operation of the device, ordering the sequence of the selected functions, selecting a value for variables of each of the selected functions, recording the selected ordered functions and the values to generate a protocol definition file readable by an executable software program, and executing the executable software program to control the operation of the device. In certain embodiments, the methods include transferring the protocol definition file to the device, particularly by data line transfer or by encoding the protocol definition file on a computer-readable medium, and reading the protocol definition file from the computer-readable medium. Computer-readable media include magnetic disks, magnetic tapes, and optical disks. Preferably the device is a cell processing device.

The protocol definition file then is read from the computer-readable medium by the executable software program. Preferably the executable software program resides or becomes resident in memory of the device and is executed by a central processing unit of the device.

The invention in other aspects provides computer readable media encoded with a program that, when executed on a computer system, performs the foregoing methods.

According to yet another aspect of the invention, apparatuses for generating a protocol for controlling operation of a device are provided. The apparatuses include means for selecting one or more functions in the operation of the device, means for ordering the sequence of the selected functions, means for selecting a value for variables of each of the selected functions, and means for recording the selected ordered functions and the values to generate a protocol definition file readable by an executable software program to control the device to run the selected functions with the selected values for variables of the functions.

Other apparatuses of the invention are apparatuses for controlling the operation of a device, which include means for selecting one or more functions in the operation of the device, means for ordering the sequence of the selected functions, means for selecting a value for variables of each of the selected functions, means for recording the selected ordered functions and the values to generate a protocol definition file readable by an executable software program, and means for executing the executable software program to control the operation of the device.

Another apparatus for generating a protocol for controlling operation of a device, includes a computer-based user interface for selecting one or more functions in the operation of the device, a computer-based user interface for ordering the sequence of the selected functions, a computer-based user interface for selecting a value for variables of each of the selected functions, a computer readable medium for recording the selected ordered functions and the values and an executable software program that generates a protocol definition file readable by an executable software program to control the device to run the selected functions with the selected values for variables of the functions.

Yet another apparatus for controlling the operation of a device includes a computer-based user interface for selecting one or more functions in the operation of the device, a computer-based user interface for ordering the sequence of the selected functions, a computer-based user interface for selecting a value for variables of each of the selected functions, a computer readable medium for recording the selected ordered functions and the values, a first executable software program that generates a protocol definition file readable by an executable software program, and a second executable software program for executing the protocol definition file to control the operation of the device. In preferred embodiments, the first executable software program and the second executable software program are connected by a data link, or the second executable software program resides or becomes resident in a computer memory of the device.

Also provided according to the invention are data structures including a group of programs or files used in the foregoing methods.

In another aspect of the invention, methods for automatically recording run parameters of a device are provided. The methods include selecting a set of run parameters of the device generated by sensors monitoring the functions of the device, sampling at predetermined time intervals the run parameters of the device, and recording on a computer-readable medium at the predetermined time intervals the run parameters. In certain embodiments, the methods also include outputting a report of the actual run parameters. In other embodiments, the methods also include comparing the actual run parameters generated by the sensors with the selected run parameters, optionally outputting a report of the actual and selected run parameters.

These and other aspects of the invention will be described in connection with the drawings and the detailed description below.

DETAILED DESCRIPTION OF THE PREFERRED EMBODIMENTS

Figure 1:
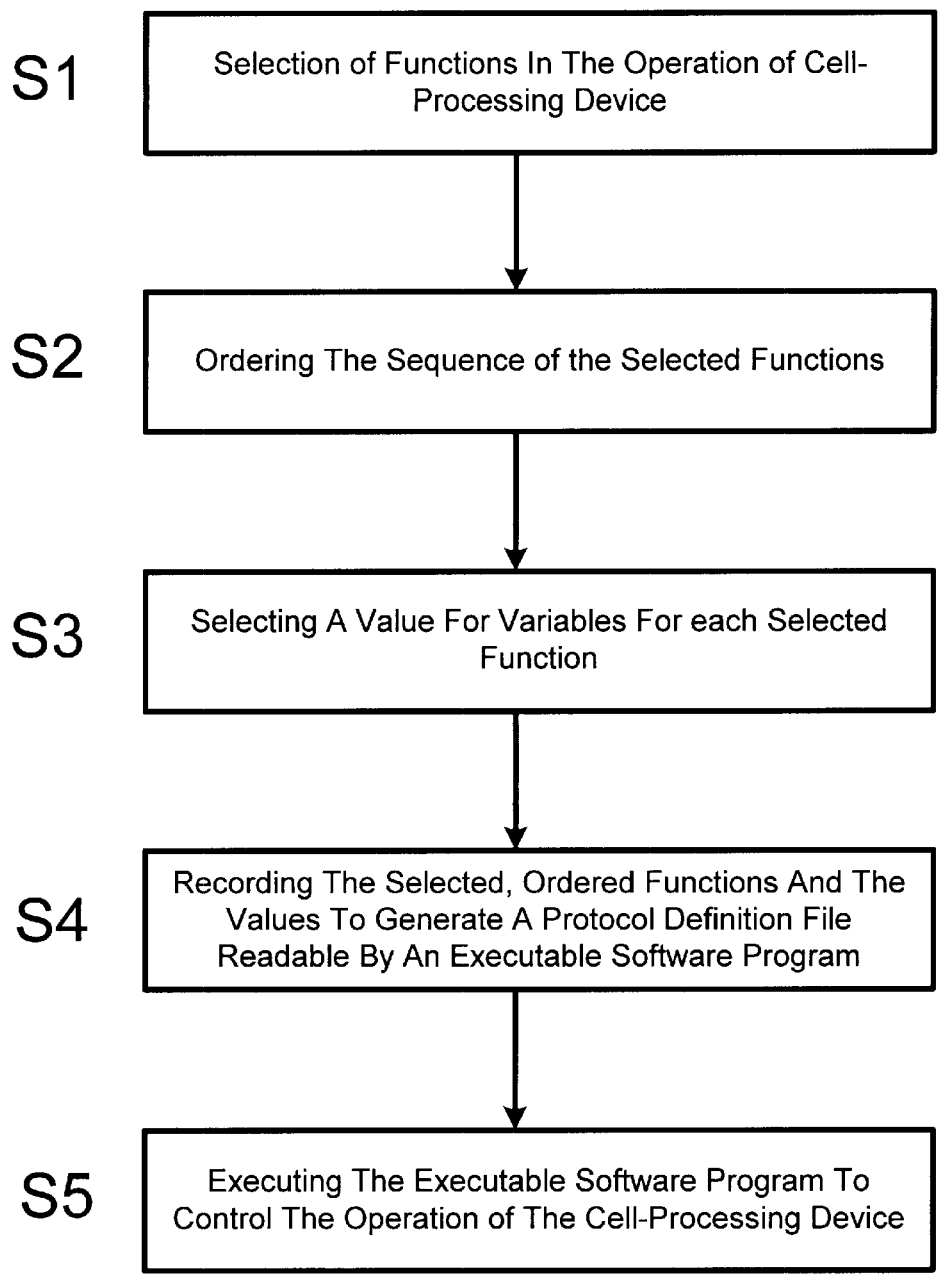
FIG. 1 illustrates a flowchart depicting a method of the flexible protocol generator for one embodiment according to the present invention.

The invention pertains to the control of complex devices, particularly cell processing devices. As used herein, a "cell processing device" or "blood processing device" refers to a device that has multiple functions carried out by device hardware for processing cells or blood. For example, cell processing devices generally include centrifuges, pumps, valves, solenoids, temperature control devices, sensors for measuring and/or controlling flow of liquids, manifolds for routing liquid flow, expressor devices, and so on. An example of a cell processing device is provided in published PCT application PCT/US98/10406. The software controlling the function of these various devices must thus carry out complex series of commands to provide adequate flexibility for processing different samples, under different conditions, and for different purposes.

This task is made more complex by the range of values possible for variables of these functions. For example, a wash function in a cell processing device (one of its simplest functions) can include an agitation step, addition of wash solution, a second agitation step, centrifugation, and finally, expression of the supernatant to waste. Even this simple step requires multiple control commands and monitoring functions to assure the steps are carried out, in the proper order, for the correct time, temperature, speed, force, etc., and without loss of the desired product during any of the steps. A user may wish to alter, add or remove one, several or all of the functions and variables to test a new protocol. Reprogramming executable code for each of these changes would require a large investment in time for the person of skill in the art.

Thus the methods and products of the invention represent a substantial increase in flexibility of control of these various operations of the devices, with a concomitant substantial decrease in complexity for the users of the devices. The flexible protocol generator permits the person of ordinary skill in the art to readily alter the operations steps of a device as controlled by executable software. In one embodiment, the fundamentals steps of which are shown in FIG. 1, the protocol generator software provides the user with a graphical user interface that permits the selection of functions from a menu (S1). For example, the simple function "add a reagent" includes the steps of (1) prime lines, (2) add reagent, (3) agitate, (4) centrifugation, (5) express to waste, and (6) purge lines. Additional steps can be added to any function by selection from various menus or by directly inputting the desired addition steps. Thus the protocol generator also allows for the creation of entirely new functions. The functions so. selected also can be rearranged or deleted as necessary (S2).

Once a function is selected, the software prompts the user to select values for the various parameters of the hardware for the particular operation (S3). For example, the user can control the volume of reagent added to a sample, the mix ratio, the speed and time of agitation, and the time of incubation.

By repeatedly selecting from the menus of functions and variables, the user can create protocols of a wide variety of complexity, and store such protocols in a "protocol definition file" (S4). The protocol definition file is then to be executed by the software that is embedded or stored on the device (S5).

The protocol generator software and the executable software that directs the function of the device according to the protocol may be but need not be resident in the device. Either or both can be remote from the controlled device.

The invention includes a device coupled to a computer, preferably over a data line, for example, for transfer of protocol definition files. Alternatively, the files generated by the protocol generator software can be transferred from the computer to the device by standard computer readable media such as magnetic or optical media. In one configuration, the data line may be a cable connecting a port of the computer to an appropriate interface on the device. Any standard computer interface can be used.

One or more computers can be configured to communicate with one or more devices as necessary in a networked arrangement so that any computer may communicate with and control any device. In such applications, the data line may be the backbone of a local area network, such as Ethernet, etc. Depending upon the type of backbone being used, the computers and devices will be equipped with the necessary hardware to enable communication among the devices. Such hardware is well known to the person of ordinary skill in the relevant arts.

In one embodiment of the invention, existing and newly created protocol definition files may be stored in a database is contained within a single computer, e.g., for access over a network, such as a file server. In other embodiments, the files may be provided as a remote database by a wide area network (WAN), such as the internet, which can be accessed over standard communication lines.

The protocol generator optionally includes software known as a "log file reader". This software uses operating data (e.g., data for the selected run parameters) provided by various sensors of the device to provide a report to the user on the actual run parameters of the device during the operations controlled by the executable software. The report may be provided through user interfaces such as monitor screens, printers, and the like. Operating data is logged at predetermined intervals, which the user can set in certain embodiments. The actual run parameters also can be compared by the log file reader to the run parameters selected by the operator to ensure the selected protocol was run properly. This function can be used in gathering regulatory data to qualify the device and/or protocol for clinical use.

Each of the foregoing patents, patent applications and references is hereby incorporated by reference.

While the invention has been described with respect to certain embodiments, it should be appreciated that many modifications and changes may be made by those of ordinary skill in the art without departing from the spirit of the invention. It is intended that such modification, changes and equivalents fall within the scope of the following claims.

What is claimed is:

1. A method for generating a protocol for controlling operation of a cell processing apparatus, comprising:
   selecting at least two functions in the operation of the cell processing apparatus for processing cells, wherein one of the functions may include centrifuging,
   ordering the sequence of the selected functions,
   selecting at least one value for at least one variable associated with at least one selected function, and
   recording the selected ordered functions and the at least one value of the at least one variable to generate a protocol definition file readable by an executable software program to control the cell processing apparatus to run the selected functions with the at least one selected value for the at least one variable of the selected functions.

2. The method of claim 1, further comprising recording the protocol definition file on a computer-readable medium.

3. The method of claim 1, wherein the at least two functions are selected from a predetermined group of functions and selectable parameters for a defined protocol.

4. The method of claim 1, wherein the cell processing apparatus comprises a blood processing apparatus.

5. The method of claim 1, wherein the group of functions comprises one or more functions selected from the group consisting of expression, incubation, agitation, addition of a sample, processing chemical or fluid, priming of fluid lines, and purging of fluid lines.

6. The method of claim 1, wherein the variables are selected from the group consisting of time of a function, temperature of an operating portion of the cell processing apparatus, speed of a function, volume of addition, and ratio of mixture of a sample, processing chemical or fluid.

7. The method of claim 1, wherein the executable software program coordinately controls hardware of the cell processing apparatus to control the functions.

8. The method of claim 7, wherein the hardware comprises one or more electrical, mechanical or electromechanical devices selected from the group consisting of motors, pumps, valves, detectors, and solenoids.

9. A method for controlling the operation of a cell processing apparatus, comprising
   selecting at least two functions in the operation of the cell processing apparatus for processing cells, wherein one of the functions may include centrifuging,
   ordering the sequence of the selected functions,
   selecting at least one value for at least one variable associated with at least one selected function,
   recording the selected ordered functions and the at least one value of the at least one variable to generate a protocol definition file readable by an executable software program, and
   executing the executable software program to control the operation of the cell processing apparatus.

10. The method of claim 9, further comprising transferring the protocol definition file to the cell processing apparatus.

11. The method of claim 10, wherein the step of transferring the protocol definition file comprises data line transfer or encoding the protocol definition file on a computer-readable medium, and reading the protocol definition file from the computer-readable medium.

12. The method of claim 11, wherein the protocol definition file is read from the computer-readable medium by the executable software program.

13. The method of claim 12, wherein the executable software program resides or becomes resident in memory of the cell processing apparatus and is executed by a central processing unit of the cell processing apparatus.

14. The method of claim 11, wherein the computer-readable medium includes a medium selected from a magnetic disk, a magnetic tape, and an optical disk.

15. The method according to claim 9, wherein the cell processing apparatus is a blood processing apparatus.

16. A computer-readable medium encoded with a program that, when executed on a computer system, performs the method of claim 1.

17. A computer-readable medium encoded with a program that, when executed on a computer system, performs the method of claim 9.

18. An apparatus for generating a protocol for controlling operation at a cell processing apparatus, comprising:

means for selecting at least two functions in the operation of the cell processing apparatus for processing cells wherein one of the functions may include centrifuging, means for ordering the sequence of the selected functions, means for selecting at least one value for at least one variable associated with at least one of the selected functions, and means for recording the selected ordered functions and the at least one value of the at least one variable to generate a protocol definition file readable by an executable software program to control the cell processing apparatus to run the selected functions with the at least one selected value for the at least one variable of the selected functions.

19. An apparatus for controlling the operation of a cell processing apparatus, comprising means for selecting at least two functions in the operation of the cell processing apparatus for processing cells, wherein one of the function may include centrifuging, means for ordering the sequence of the selected functions, means for selecting at least one value for at least one variable of at least one of the selected functions, means for recording the selected ordered functions and the at least one value of the at least one variable to generate a protocol definition file readable by an executable software program, and means for executing the executable software program to control the operation of the cell processing apparatus.

20. An apparatus for generating a protocol for controlling operation of a cell processing apparatus, comprising:

a computer-based user interface for selecting at least two functions in the operation of the cell processing apparatus for processing cells, wherein one of the functions may include centrifuging, a computer-based user interface for ordering the sequence of the selected functions, a computer-based user interface for selecting at least one value of at least one variable associated with at least one of the selected functions, a computer readable medium for recording the selected ordered functions and the at least one value of the at least one variable and an executable software program that generates a protocol definition file readable by an executable software program to control the cell processing apparatus to run the selected functions with the at least one selected value for the at least one variable of the selected functions.

21. An apparatus for controlling the operation of a cell processing apparatus, comprising:

a computer-based user interface for selecting at least two functions in the operation of the cell processing apparatus for processing cells wherein one of the selected functions may include centrifuging, a computer-based user interface for ordering the sequence of the selected functions, a computer-based user interface for selecting at least one value for at least one variable associated with at least one of the selected functions, a computer readable medium for recording the selected ordered functions and the at least one selected value of the at least one variable, a first executable software program that generates a protocol definition file readable by an executable software program, and a second executable software program for executing the protocol definition file to control the operation of the cell processing apparatus for processing cells.

22. The apparatus of claim 21, wherein the first executable software program and the second executable software program are connected by a data link.

23. The apparatus of claim 21, wherein the second executable software program resides or becomes resident in a computer memory of the apparatus.

24. A method for automatically recording run parameters of a cell processing apparatus, comprising:

selecting a set of run parameters of the cell processing apparatus, wherein the run parameters correspond to functions in the operation of the cell processing appqaratus and wherein the run parameters are monitored by corresponding sensors of the cell processing apparatus, the functions comprising at least two selected functions in the operation of the cell processing appqaratus, wherein one of the functions may include centrifuging, sampling at predetermined time intervals the run parameters of the cell processing apparatus, and recording on a computer-readable medium at the predetermined time intervals the run parameters.

25. The method of claim 24, further comprising outputting a report of the actual run parameters.

26. The method of claim 24, further comprising comparing the actual run parameters generated by the sensors with the selected run parameters.

27. The method of claim 24, further comprising outputting a report of the actual and selected run parameters.

* * * * *